United States Patent
Ledford et al.

(10) Patent No.: US 8,142,292 B2
(45) Date of Patent: Mar. 27, 2012

(54) UNIVERSAL JOINT WITH TRUNNION SHAFT SEAL ASSEMBLY

(75) Inventors: Kevin M. Ledford, Macomb, MI (US); Russell R. Ryan, II, San Clemente, CA (US); Donald S. DeVries, Newport Beach, CA (US); Patrick S. Adair, Irvine, CA (US)

(73) Assignee: American Axle & Manufacturing, Inc., Detroit, MI (US)

( * ) Notice: Subject to any disclaimer, the term of this patent is extended or adjusted under 35 U.S.C. 154(b) by 263 days.

(21) Appl. No.: 12/626,365

(22) Filed: Nov. 25, 2009

(65) Prior Publication Data

US 2010/0160052 A1    Jun. 24, 2010

Related U.S. Application Data

(60) Provisional application No. 61/118,177, filed on Nov. 26, 2008.

(51) Int. Cl.
*F16D 3/41* (2006.01)
*F16J 15/32* (2006.01)

(52) U.S. Cl. .................................. 464/131; 277/566
(58) Field of Classification Search .............. 464/11, 464/128, 130–133; 277/353, 562, 565–567, 277/571, 576, 649
See application file for complete search history.

(56) References Cited

U.S. PATENT DOCUMENTS

| | | |
|---|---|---|
| 4,466,623 A | 8/1984 | Antonini et al. |
| 4,512,672 A * | 4/1985 | Olschewski et al. ......... 464/131 |
| 4,874,349 A | 10/1989 | Gall |
| 5,129,744 A | 7/1992 | Otto et al. |
| 5,209,499 A | 5/1993 | Ruff, Jr. et al. |
| 5,398,942 A | 3/1995 | Duckwall et al. |
| 5,597,258 A | 1/1997 | Kincaid et al. |
| 5,716,277 A | 2/1998 | Reynolds |
| 6,095,925 A | 8/2000 | Smith |
| 6,162,126 A | 12/2000 | Barrett et al. |
| 6,183,369 B1 * | 2/2001 | Faulbecker et al. ........... 464/131 |
| 6,280,335 B1 | 8/2001 | Wehner et al. |
| 6,336,868 B1 | 1/2002 | Kurecka et al. |
| 6,354,602 B1 | 3/2002 | Oldenburg |
| 6,357,754 B1 * | 3/2002 | Rieder et al. |
| 6,357,757 B1 | 3/2002 | Hibbler et al. |
| 6,406,187 B1 * | 6/2002 | Lentini et al. |
| 6,692,007 B2 | 2/2004 | Oldenburg |
| 6,814,668 B2 | 11/2004 | Grupido |
| 6,821,207 B2 | 11/2004 | Bommarito et al. |
| 6,827,649 B2 | 12/2004 | Menosky et al. |
| 6,837,795 B2 | 1/2005 | Menosky et al. |
| 6,855,059 B2 | 2/2005 | Menosky et al. |
| 6,893,350 B2 | 5/2005 | Menosky et al. |
| 6,957,918 B2 | 10/2005 | Beutler et al. |
| 6,962,344 B2 * | 11/2005 | Yano et al. .................... 277/562 |
| 6,994,627 B2 | 2/2006 | Menosky et al. |
| 7,004,841 B2 | 2/2006 | Bommarito et al. |

(Continued)

*Primary Examiner* — Gregory Binda
*Assistant Examiner* — Josh Skroupa
(74) *Attorney, Agent, or Firm* — Harness, Dickey & Pierce, P.L.C.

(57) ABSTRACT

A universal joint that includes a spider, which has a trunnion, a bearing cup, a bearing, which is disposed between the trunnion and the bearing cup, and a seal assembly. The seal assembly has a first portion, which is engaged to the spider, and a second portion that sealingly engages the bearing cup and the first portion. The first portion can include features that limit axial movement of the second portion relative to the first portion.

18 Claims, 3 Drawing Sheets

U.S. PATENT DOCUMENTS

| | | |
|---|---|---|
| 7,025,679 B2 | 4/2006 | Menosky et al. |
| 7,044,859 B2 | 5/2006 | Menosky et al. |
| 7,201,663 B2 | 4/2007 | Menosky |
| 7,258,490 B2 * | 8/2007 | Peschke et al. |
| 7,278,212 B2 | 10/2007 | Bommarito |
| 7,320,644 B2 | 1/2008 | Wehner |
| 7,338,384 B2 | 3/2008 | Patrascu et al. |
| 7,361,093 B2 | 4/2008 | Kurzeja |
| 7,520,814 B2 | 4/2009 | Eversole et al. |
| 7,604,544 B2 | 10/2009 | Wehner |
| 2007/0132195 A1 | 6/2007 | Ishii |
| 2009/0011841 A1 * | 1/2009 | Wang .......................... 464/132 |

* cited by examiner

UNIVERSAL JOINT WITH TRUNNION SHAFT SEAL ASSEMBLY

This application claims the benefit of U.S. Provisional Application No. 61/118,177, filed on Nov. 26, 2008, the disclosure of which is hereby incorporated herein by reference.

INTRODUCTION

The present invention generally relates to a universal joint with a trunnion shaft seal assembly.

One type of universal joint includes a cross-shaped member, which is commonly referred to as a spider, that has four trunnions that extend at right angles relative to one another. The trunnions are typically received in a bearing cup and bearings are disposed between the trunnions and the inner surfaces of the bearing cups. It is known to employ seals in such universal joints to restrict entry of contaminants into the interior of the bearing cup, as well as to inhibit the egress of a bearing lubricant that is disposed in the interior of the bearing cup. Known seal assemblies can include a dust shield that can aid in protecting a seal, as well as cooperate with the seal to form a labyrinth that can aid in shielding the sealing portion of the seal from contaminants. Such seal assemblies, however, can separate during handling so as to present problems during their installation to the spider.

SUMMARY

This section provides a general summary of some aspects of the present disclosure and is not a comprehensive listing or detailing of either the full scope of the disclosure or all of the features described therein.

In one form, the present teachings provide a universal joint that includes a spider, a bearing cup, a bearing and a seal assembly. The spider has a trunnion that includes a trunnion bearing surface, a trunnion sealing surface and a bearing mount surface. The trunnion sealing surface and the bearing mount surface are coaxial with the trunnion bearing surface. The bearing cup has an open end, an inner bearing surface, and a bearing cup sealing surface that is coaxial with the inner bearing surface. The bearing is disposed between the trunnion bearing surface and the inner bearing surface. The seal assembly is sealingly engaged to the bearing cup and the spider. The seal assembly includes a first portion and a second portion. The first portion is mounted on the seal mount surface and has a first annular wall member, a second annular wall member and a radially extending wall member that spaces the first and second annular wall members radially apart from one another so as to define an interior channel that is disposed coaxially about the trunnion. The second portion includes a first seal member, a second seal member, and a third seal member. The first seal member is sealingly engaged to the trunnion sealing surface, the second seal member is sealingly engaged to one of the trunnion sealing surface and the first annular wall member and the third seal member is sealingly engaged to the second annular wall member.

In another form, the present teachings provide a universal joint that includes a spider, a bearing cup, a bearing and a seal assembly. The spider has a trunnion that includes a trunnion bearing surface, a trunnion sealing surface and a bearing mount surface. The trunnion sealing surface and the bearing mount surface are coaxial with the trunnion bearing surface. The bearing cup has an open end, an inner bearing surface, and a bearing cup sealing surface that is coaxial with the inner bearing surface. The bearing is disposed between the trunnion bearing surface and the inner bearing surface. The seal assembly is sealingly engaged to the bearing cup and the spider. The seal assembly includes a first portion and a second portion. The first portion is mounted on the seal mount surface and has a first annular wall member, a second annular wall member and a radially extending wall member that spaces the first and second annular wall members radially apart from one another so as to define an interior channel that is disposed coaxially about the trunnion. The second portion includes a bumper and being sealing engaged to the trunnion sealing surface and the first portion. The bumper is configured to contact the radially extending wall member to limit axial movement of the second portion of the seal assembly toward the first portion of the seal assembly.

Further areas of applicability will become apparent from the description provided herein. It should be understood that the description and specific examples in this summary are intended for purposes of illustration only and are not intended to limit the scope of the present disclosure, its application and/or uses in any way.

BRIEF DESCRIPTION OF THE DRAWINGS

The drawings described herein are for illustrative purposes only and are not intended to limit the scope of the present disclosure in any way. The drawings are illustrative of selected teachings of the present disclosure and do not illustrate all possible implementations. Similar or identical elements are given consistent identifying numerals throughout the various figures.

DETAILED DESCRIPTION OF THE VARIOUS EMBODIMENTS

Figure 1:
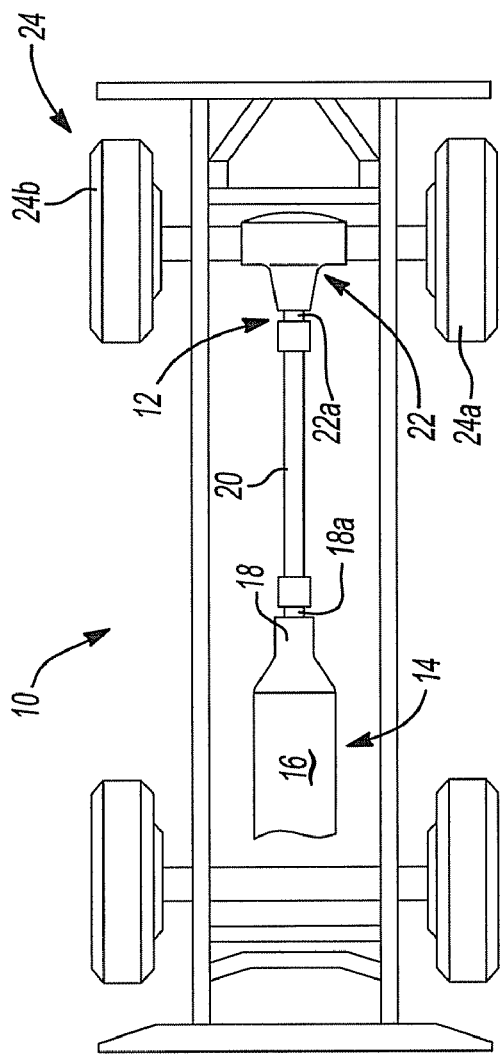
FIG. 1 is a schematic illustration of a vehicle having a propshaft assembly with a universal joint constructed in accordance with the teachings of the present disclosure.

With reference to FIG. 1 of the drawings, a vehicle having a propshaft assembly with a universal joint that is constructed in accordance with the teachings of the present disclosure is generally indicated by reference numeral 10. The vehicle 10 can include a driveline 12 that is drivable via a connection to a power train 14. The power train 14 can include an engine 16 and a transmission 18. The driveline 12 can include a propshaft assembly 20, a rear axle assembly 22 and a plurality of wheels 24. The engine 16 can be mounted in an in-line or longitudinal orientation along the axis of the vehicle 10 and its output can be selectively coupled via a conventional clutch to the input of the transmission 18 to transmit rotary power (i.e., drive torque) therebetween. The input of the transmission 18 can be commonly aligned with the output of the engine 16 for rotation about a rotary axis. The transmission 18 can also include an output and a gear reduction unit. The gear reduction unit can be operable for coupling the transmission input to the transmission output at a predetermined gear speed ratio. The propshaft assembly 20 can be coupled for rotation with the output of the transmission 18. Drive torque can be transmitted through the propshaft assembly 20 to the rear axle assembly 22 and can be transmitted in a predetermined manner to the left and right rear wheels 24a and 24b, respectively.

Figure 2:
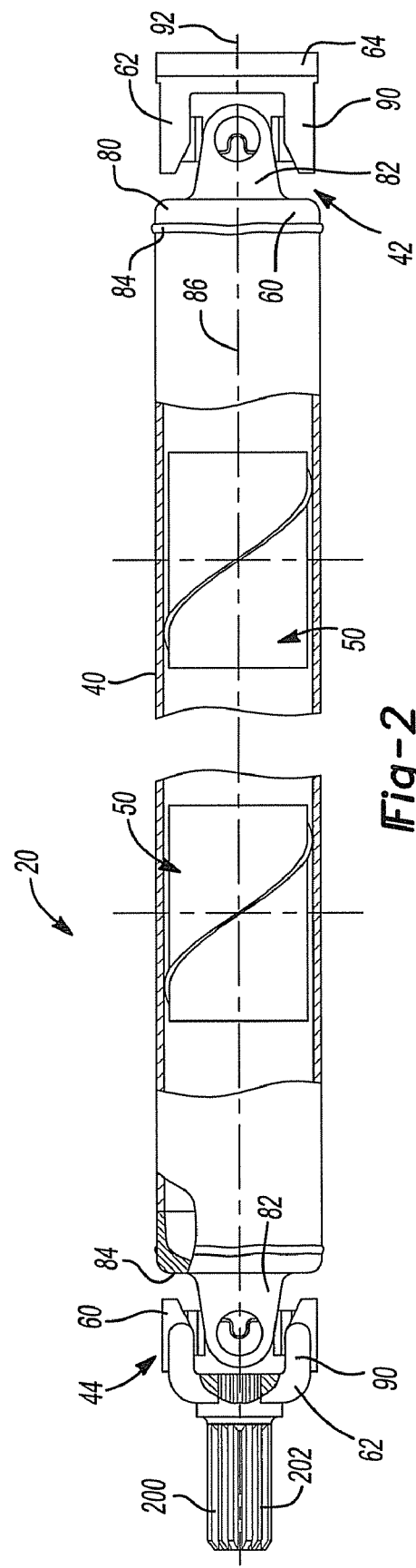
FIG. 2 is a side elevation view in partial section of the propshaft assembly of FIG. 1.
Figure 3:
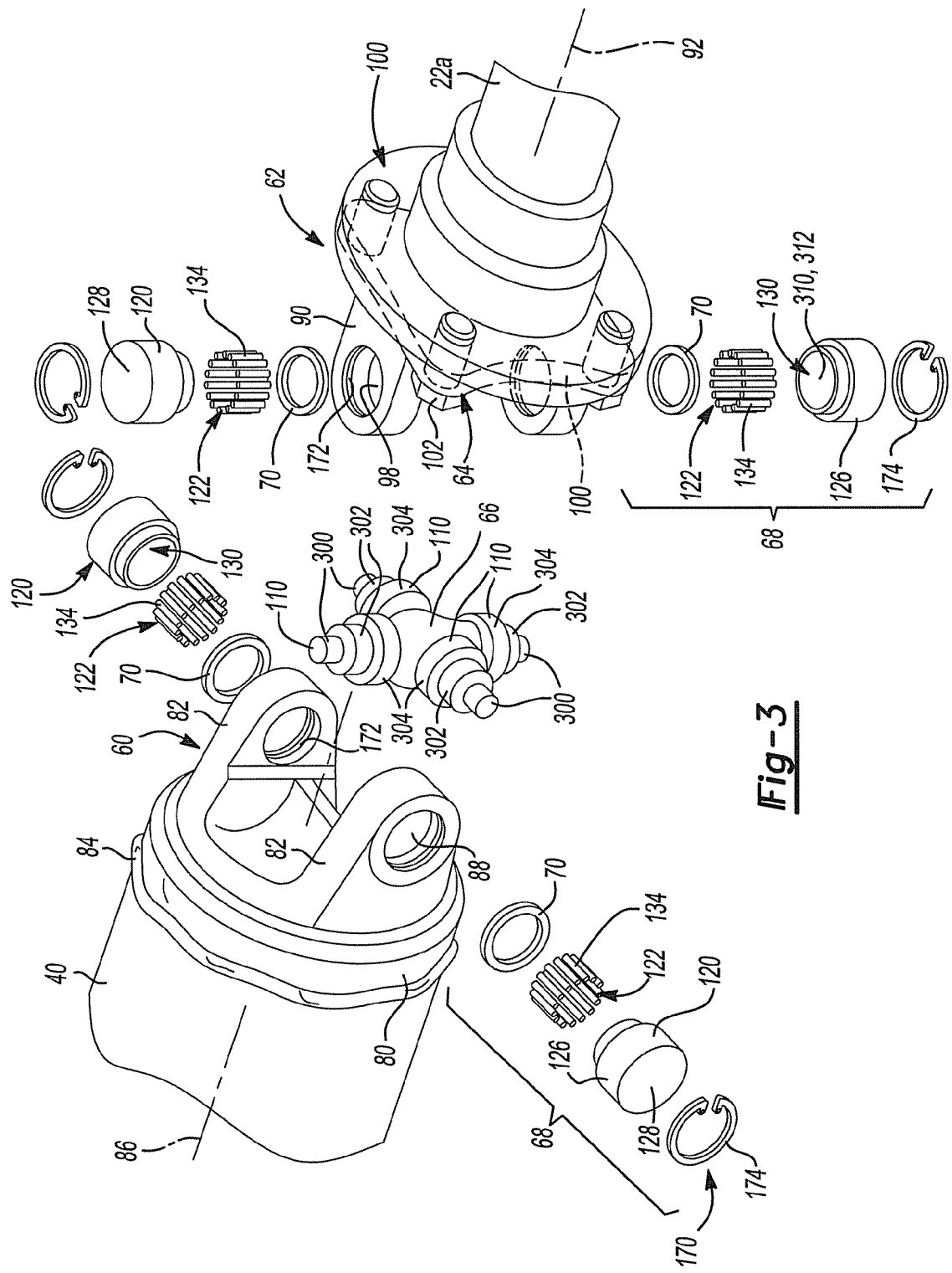
FIG. 3 is an exploded perspective view of a portion of the propshaft assembly of FIG. 1 illustrating the universal joint in more detail.

With reference to FIGS. 2 and 3, the propshaft assembly 20 can include a shaft member 40, a first universal joint 42 and a second universal joint 44. The shaft member 40 can be formed of an appropriate structural material, such as a tubular steel or aluminum material, and can be equipped with one or more inserts and/or one or more liners 50 to attenuate one or more types of vibrations (e.g., bending mode, shell mode).

The first universal joint 42 can include a first yoke member 60, a second yoke member 62, a first coupling 64, a spider 66, a plurality of bearing assemblies 68 and a plurality of seal assemblies 70.

The first yoke member 60 can include a first coupling portion 80 and a pair of first arms 82. The first coupling portion 80 can be configured to be fixedly coupled to the shaft member 40, such as through a weld 84. The first arms 82 can be disposed about a rotational axis 86 of the first yoke member 60. A first bearing aperture 88 can be formed through each of the first arms 82 in a direction that is generally perpendicular to the rotational axis 86 of the first yoke member 60.

The second yoke member 62 can include a pair of second arms 90 that can be disposed about a rotational axis 92 of the second yoke member 62. A second bearing aperture 98 can be formed through each of the second arms 90 in a direction that is generally perpendicular to the rotational axis 92 of the second yoke member 62.

The first coupling 64 can be fixedly coupled to the second yoke member 62 and can be configured to be coupled to the input pinion 22a of the rear axle assembly 22 (FIG. 1) in a conventional manner. For example, the first coupling 64 and the input pinion 22a can include flanges 100 that can be coupled to one another via a plurality of threaded fasteners 102. It will be appreciated, however, that other types of coupling systems can be employed to couple the first universal joint 42 to a first shaft and as such, the first coupling 64 can be configured in any appropriate manner in accordance with such coupling systems.

Figure 4:
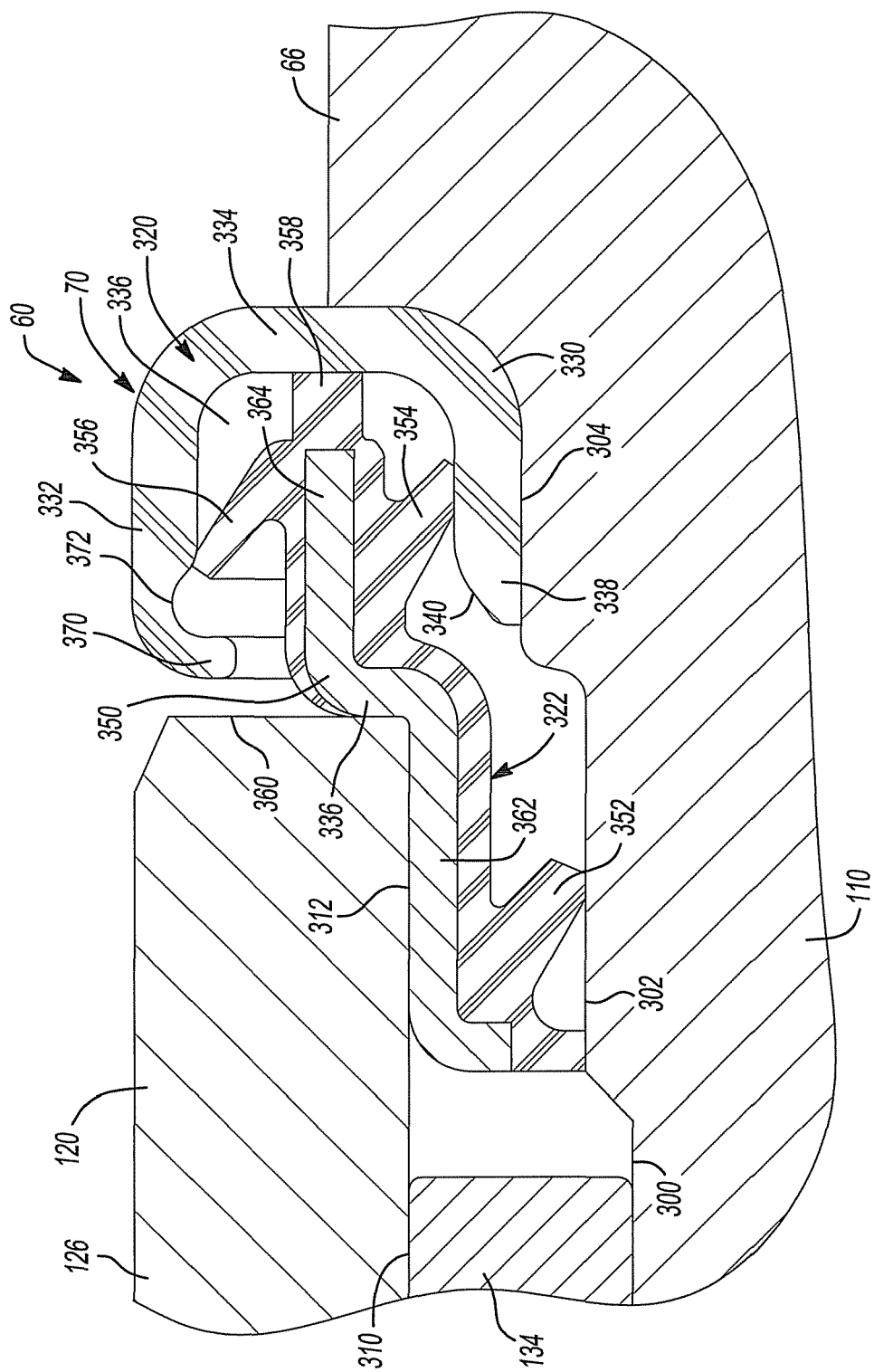
FIG. 4 is a sectional view of a portion of the universal joint.

With reference to FIGS. 3 and 4, the spider 66 can include a plurality of trunnions 110 that can be disposed in a common plane and at right angles relative to one another (i.e., the trunnions 10 can be disposed along axes that are generally perpendicular to one another and orthogonal to the rotational axes 86 and 92 of the first and second yoke members 60 and 62). Each of the trunnions 110 can include a trunnion bearing surface 300, a trunnion sealing surface 302 and a seal mount surface 304. The trunnion sealing surface 302 and the seal mount surface 304 can be coaxial with the trunnion bearing surface 300. In the particular example provided, the trunnion sealing surface 302 is radially outward of the trunnion bearing surface 300 and the seal mount surface 304 is radially outward of the trunnion sealing surface 302.

Each of the bearing assemblies 68 can include a bearing cup 120 and a bearing set 122. The bearing cup 120 can be formed of metal and can include an annular side wall 126 and an end wall 128 that can cooperate with the annular side wall 126 to form a bearing cavity 130 with an open end. An interior side of the annular side wall 126 can define an inner bearing surface 310 and a bearing cup sealing surface 312 that can be coaxial with the inner bearing surface 310. The bearing set 122 can comprise a plurality of roller bearings 134 that can be disposed between inner bearing surface 310 and the trunnion bearing surface 300.

The seal assembly 70 can be sealingly engaged to the bearing cup 120 and the spider 66 and can include a first portion 320 and a second portion 322.

The first portion 320 can be mounted on the seal mount surface 304 and can have a first annular wall member 330, a second annular wall member 332 and a radially extending wall member 334 that spaces the first and second annular wall members 330 and 332 radially apart from one another so as to define an interior channel 336 that is disposed coaxially about the trunnion 110. An end 338 of the first annular wall member 330 opposite the radially extending wall member 334 can have a reduced diameter lead-in 340 that facilitates assembly of the second portion 322 of the seal assembly 70 thereto.

The second portion 322 can include a frame member 350, a first seal member 352, a second seal member 354, a third seal member 356 and a bumper 358. The frame member 350 can have a flattened "S" shape and can be abutted against an axial end face 360 of the bearing cup 120. The frame member 350 can include a first annular portion 362 and a second annular portion 364 interconnected by an intermediate radial portion 366 which is shown abutting the end face 360 of the bearing cup 120. The first seal member 352 can be mounted on the first annular portion 362 and the second seal member 354, the third seal member 356 and the bumper 358 can be mounted on the second annular portion 364.

The first seal member 352 can be sealingly engaged to the trunnion sealing surface 302. The second seal member 354 can be sealingly engaged to one of the trunnion sealing surface 302 and the first annular wall member 330. In the particular example provided, the second seal member 354 is sealingly engaged to the first annular wall member 330 and the first seal member 352 is disposed radially inwardly of the second seal member 354. The third seal member 356 can be sealingly engaged to the second annular wall member 332. The bumper 358 can be configured to contact the radially extending wall member 334 to limit axial movement of the second portion 322 of the seal assembly 70 toward the first portion 320 of the seal assembly 70.

In the particular example provided, the second annular wall member 332 includes a radially inwardly extending lip 370 that is spaced apart from the radially extending wall member 334 and an undercut radius 372 can be formed into the second annular wall member 332 between the radially extending wall member 334 and the radially inwardly extending lip 370. Contact between the third seal member 356 and the radially inwardly extending lip 370 can limit axial movement of the second portion 322 of the seal assembly 70 away from the first portion 320 of the seal assembly 70.

Returning to FIGS. 2 and 3, the second universal joint 44 can be identical to the first universal joint 42 except that a second coupling 200 can be coupled to the second yoke member 62. The second coupling 200 can be configured to be coupled to the output shaft 18a (FIG. 1) of the transmission 18 (FIG. 1) in a conventional manner. For example, one of the output shaft 18a (FIG. 1) and the second coupling 200 can include a male splined shaft 202 that can be configured to be matingly received into a female splined aperture (not specifically shown) formed in the other one of the output shaft 18a (FIG. 1) and the second coupling 200. It will be appreciated, however, that other types of coupling systems can be employed to couple the second universal joint 44 to a second shaft and as such, the second coupling 200 can be configured in any appropriate manner in accordance with such coupling systems.

It will be appreciated that the above description is merely exemplary in nature and is not intended to limit the present disclosure, its application or uses. While specific examples have been described in the specification and illustrated in the drawings, it will be understood by those of ordinary skill in the art that various changes may be made and equivalents may be substituted for elements thereof without departing from the scope of the present disclosure as defined in the claims. Furthermore, the mixing and matching of features, elements and/or functions between various examples is expressly contemplated herein, even if not specifically shown or described, so that one of ordinary skill in the art would appreciate from this disclosure that features, elements and/or functions of one example may be incorporated into another example as appropriate, unless described otherwise, above. Moreover, many modifications may be made to adapt a particular situation or material to the teachings of the present disclosure without departing from the essential scope thereof. Therefore, it is intended that the present disclosure not be limited to the particular examples illustrated by the drawings and described in the specification as the best mode presently contemplated for carrying out the teachings of the present disclosure, but that the scope of the present disclosure will include any embodiments falling within the foregoing description and the appended claims.

What is claimed is:

1. A universal joint comprising:
a spider having a trunnion that includes a trunnion bearing surface, a trunnion sealing surface and a seal mount surface, the trunnion sealing surface and the seal mount surface being coaxial with the trunnion bearing surface;
a bearing cup having an open end, an inner bearing surface, and a bearing cup sealing surface, the bearing cup sealing surface being coaxial with the inner bearing surface;
a bearing disposed between the trunnion bearing surface and the inner bearing surface; and
a seal assembly sealingly engaged to the bearing cup and the spider, the seal assembly including a first portion and a second portion, the first portion being mounted on the seal mount surface and having a first annular wall member, a second annular wall member and a radially extending wall member that spaces the first and second annular wall members radially apart from one another so as to define an interior channel that is disposed coaxially about the trunnion, the second portion including a first seal member, a second seal member, a third seal member and a bumper, the first seal member being sealingly engaged to the trunnion sealing surface, the second seal member being sealingly engaged to one of the trunnion sealing surface and the first annular wall member, the third seal member being sealingly engaged to the second annular wall member, and the bumper contacting the radially extending wall member to limit axial movement of the second portion toward the first portion.

2. The universal joint of claim 1, wherein the trunnion sealing surface is radially outwardly of the trunnion bearing surface.

3. The universal joint of claim 1, wherein the second annular wall member includes a radially inwardly extending lip that is spaced apart from the radially extending wall and wherein contact between the third seal member and the radially inwardly extending lip limits axial movement of the second portion of the seal assembly away from the first portion of the seal assembly.

4. The universal joint of claim 3, wherein the first seal member is disposed radially inwardly of the second seal member.

5. The universal joint of claim 4, wherein the second portion of the seal assembly includes a frame member having a flattened "S" shape and wherein the frame member is abutted against an axial end face of the bearing cup.

6. The universal joint of claim 5, wherein the frame member includes a first annular portion and a second annular portion, wherein the first seal member is mounted on the first annular portion, and wherein the second seal member, the third seal member and the bumper are mounted on the second annular portion.

7. The universal joint of claim 3, wherein an end of the first annular wall member opposite the radially extending wall member has a reduced diameter lead-in.

8. The universal joint of claim 3, wherein an undercut radius is formed into the second annular wall member between the radially extending wall member and the radially inwardly extending lip.

9. A universal joint comprising:
a spider having a trunnion that includes a trunnion bearing surface, a trunnion sealing surface and a seal mount surface, the trunnion sealing surface and the seal mount surface being coaxial with the trunnion bearing surface;
a bearing cup having an open end, an inner bearing surface, and a bearing cup sealing surface, the bearing cup sealing surface being coaxial with the inner bearing surface;
a bearing disposed between the trunnion bearing surface and the inner bearing surface; and
a seal assembly sealingly engaged to the bearing cup and the spider, the seal assembly including a first portion and a second portion, the first portion being mounted on the seal mount surface and having a first annular wall member, a second annular wall member and a radially extending wall member that spaces the first and second annular wall members radially apart from one another so as to define an interior channel that is disposed coaxially about the trunnion, the second portion including a first seal member, a second seal member, a third seal member and a bumper, the first seal member being sealingly engaged to the trunnion sealing surface, the second seal member being sealingly engaged to the first annular wall member, the third seal member being sealingly engaged to the second annular wall member, and the bumper contacting the radially extending wall member to limit axial movement of the second portion toward the first portion.

10. The universal joint of claim 9, wherein the trunnion sealing surface is radially outwardly of the trunnion bearing surface.

11. The universal joint of claim 9, wherein the second annular wall member includes a radially inwardly extending lip that is spaced apart from the radially extending wall and wherein contact between the third seal member and the radially inwardly extending lip limits axial movement of the second portion of the seal assembly away from the first portion of the seal assembly.

12. The universal joint of claim 11, wherein the first seal member is disposed radially inwardly of the second seal member.

13. The universal joint of claim 12, wherein the second portion of the seal assembly includes a frame member having a flattened "S" shape and wherein the frame member is abutted against an axial end face of the bearing cup.

14. The universal joint of claim 13, wherein the frame member includes a first annular portion and a second annular portion, wherein the first seal member is mounted on the first annular portion, and wherein the second seal member, the third seal member and the bumper are mounted on the second annular portion.

15. The universal joint of claim 11, wherein an end of the first annular wall member opposite the radially extending wall member has a reduced diameter lead-in.

16. The universal joint of claim 11, wherein an undercut radius is formed into the second annular wall member between the radially extending wall member and the radially inwardly extending lip.

17. A universal joint comprising:
a spider having a trunnion that includes a trunnion bearing surface, a trunnion sealing surface and a seal mount surface, the trunnion sealing surface and the seal mount surface being coaxial with the trunnion bearing surface;
a bearing cup having an open end defining an end surface, an inner bearing surface, and a bearing cup sealing surface, the bearing cup sealing surface being coaxial with the inner bearing surface;
a bearing disposed between the trunnion bearing surface and the inner bearing surface; and
a seal assembly sealingly engaged to the bearing cup and the spider, the seal assembly including a first portion and a second portion, the first portion being mounted on the seal mount surface and having a first annular wall member, a second annular wall member and a radially extending wall member that spaces the first and second annular wall members radially apart from one another so as to define an interior channel that is disposed coaxially about the trunnion, the second portion including a a frame member, a first seal member, a second seal member, a third seal member and a bumper, the frame having first and second annular portions interconnected by an intermediate radial portion such that the first annular portion engages the bearing cup sealing surface and the intermediate radial portion engages the end surface of the bearing cup, the first seal member being mounted on the first annular portion of the frame and sealingly engaging the trunnion sealing surface, the second seal member being mounted on the second annular portion of the frame and sealingly engaging one of the trunnion sealing surface and the first annular wall member, the third seal member being mounted on the second annular portion of the frame and sealingly engaging the second annular wall member, and the bumper extending axially outward from the second annular portion of the frame and being configured to contact the radially extending wall member to limit axial movement of the second portion of the seal assembly toward the first portion of the seal assembly.

18. A universal joint comprising:
a spider having a trunnion that includes a trunnion bearing surface, a trunnion sealing surface and a seal mount surface, the trunnion sealing surface and the seal mount surface being coaxial with the trunnion bearing surface;
a bearing cup having an open end, an inner bearing surface, and a bearing cup sealing surface, the bearing cup sealing surface being coaxial with the inner bearing surface;
a bearing disposed between the trunnion bearing surface and the inner bearing surface; and
a seal assembly sealingly engaged to the bearing cup and the spider, the seal assembly including a first portion and a second portion, the first portion being mounted on the seal mount surface and having a first annular wall member, a second annular wall member and a radially extending wall member that spaces the first and second annular wall members radially apart from one another so as to define an interior channel that is disposed coaxially about the trunnion, the second portion including a first seal member, a second seal member, a third seal member and a bumper, the first seal member being sealingly engaged to the trunnion sealing surface, the second seal member being sealingly engaged to the first annular wall member, the third seal member being sealingly engaged to the second annular wall member, the bumper being configured to contact the radially extending wall member to limit axial movement of the second portion of the seal assembly toward the first portion of the seal assembly;
wherein the trunnion sealing surface is radially outwardly of the trunnion bearing surface;
wherein the second annular wall member includes a radially inwardly extending lip that is spaced apart from the radially extending wall and wherein contact between the third seal member and the radially inwardly extending lip limits axial movement of the second portion of the seal assembly away from the first portion of the seal assembly;
wherein the first seal member is disposed radially inwardly of the second seal member;
wherein the second portion of the seal assembly includes a frame member having a flattened "S" shape and wherein the frame member is abutted against an axial end face of the bearing cup;
wherein the frame member includes a first annular portion and a second annular portion, wherein the first seal member is mounted on the first annular portion, and wherein the second seal member, the third seal member and the bumper are mounted on the second annular portion;
wherein an end of the first annular wall member opposite the radially extending wall member has a reduced diameter lead-in; and
wherein an undercut radius is formed into the second annular wall member between the radially extending wall member and the radially inwardly extending lip.

* * * * *